Aug. 4, 1964  F. L. STOLLER  3,142,969
REFRIGERATION CONTROL SYSTEM
Filed Nov. 13, 1962
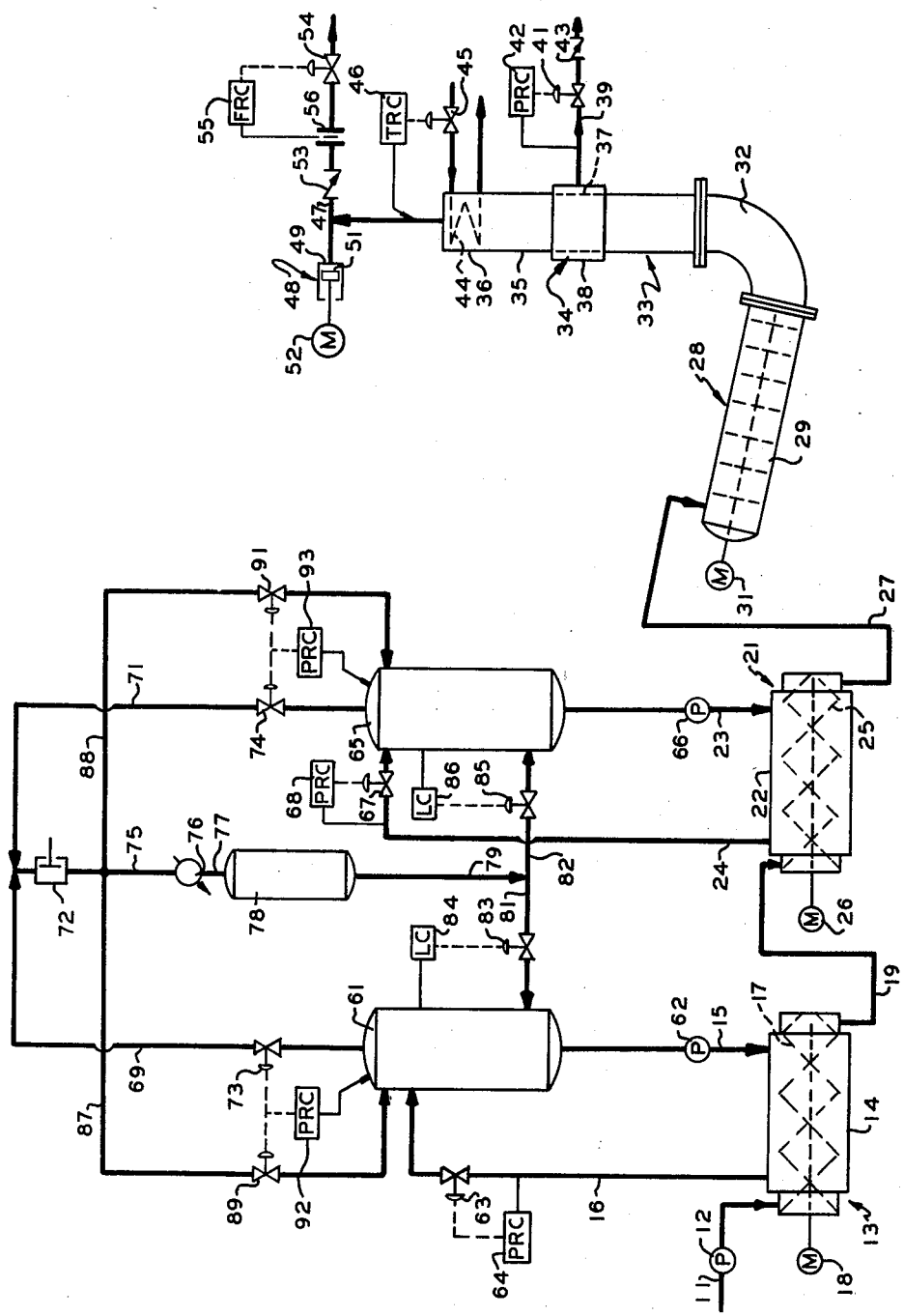
INVENTOR.
F.L. STOLLER
BY
*Young & Quigg*
ATTORNEYS

United States Patent Office 3,142,969
Patented Aug. 4, 1964

3,142,969
REFRIGERATION CONTROL SYSTEM
Frederick L. Stoller, Bartlesville, Okla., assignor to Phillips Petroleum Company, a corporation of Delaware
Filed Nov. 13, 1962, Ser. No. 236,789
9 Claims. (Cl. 62—58)

This invention relates to method and apparatus for controlling the cooling power of a refrigerant. In one aspect the invention relates to method and apparatus for controlling the temperature of a refrigerant. In another aspect the invention relates to a fractional crystallization system for the separation and purification of components of a multi-component mixture having an improved control system for regulating the degree to which the mixture is cooled.

The separation of chemical compounds by means of crystallization finds many applications in industrial installations. While many separations can be made by distillation or solvent extraction, there are cases where these methods are impracticable or impossible, and the desired separation can be effected more advantageously by means of crystallization. Thus, in the case of chemical isomers having similar boiling points and solubilities, or materials having relatively high boiling ranges, or thermally unstable substances, separation by crystallization may be the only method which can be advantageously employed.

As well as offering in many cases perhaps the only practicable method of separation, the crystallization method offers the further advantage of being the only separation method which in the case of eutectic-forming systems theoretically gives a pure product in a single stage of operation. In actual practice, however, the crystals obtained from a solution of several components will be impure because of the occlusion of mother liquor within the crystal interstices. In the conventional fractional crystallization processes, the crystal yield from one batch crystallization is redissolved in a solvent or remelted and again crystallized to effect further purification. The recrystallized product will have less impurities since the concentration of impurity in the new liquor is less than in the previous liquor of crystallization. Such processes require a large amount of equipment and floor space for their operation with resulting high operating expenditures in terms of labor and equipment costs. Furthermore, in these types of processes the purity of the product is limited by the number of stages through which the process is carried.

More recently, a continuous method of separating and purifying multi-component mixtures has been advanced which overcomes the disadvantages of conventional fractional crystallization processes. This method involves cooling a liquid multi-component mixture from which the separation is to be made so as to form crystals of at least one component and thereafter supplying the resulting slurry to a crystal separation and purification column. In this column, crystals are separated from mother liquor and then passed toward one end in which a melting section is maintained. The crystals are melted in the melting section and a portion of the melt is withdrawn as product. The remainder of the melt is displaced countercurrently to the movement of crystals and in intimate contact therewith so as to remove occluded impurities.

When practicing the above-described crystal separation and purification method, it has been found to be desirable to supply to the separation and purification column a slurry which has a constant solids content. When operating in this manner, the production of a high purity product in high yields is greatly facilitated. It also makes possible a steady operating procedure in which fluctuations in product yield and product purity are reduced to a minimum. Furthermore, when practicing the above-described method, it is often desirable to maintain the solids content of the slurry as high as possible while still producing a slurry which is capable of flowing. In order to maintain a high solids content slurry, close control over the refrigeration process whereby the solids are formed is required.

In accordance with the present invention I have now found a method and apparatus for regulating the temperature of the refrigerant and thereby controlling the degree to which a fluid is cooled. In accordance with a first embodiment of the invention there is provided a refrigerant zone, means for passing the fluid to be cooled in indirect heat exchanging relationship with at least a portion of the liquid refrigerant in said refrigerant zone, means for withdrawing refrigerant vapor from said refrigerant zone and for compressing the thus withdrawn refrigerant vapor, means for condensing a first portion of the thus compressed vapor, means for returning a second portion of said compressed vapor into said refrigerant zone, means for controlling the rate of withdrawal of refrigerant vapor from said refrigerant zone and the rate of returning said second portion into said refrigerant zone in an opposite manner responsive to the pressure in said refrigerant zone, and means for introducing the condensed vapor into said refrigerant zone in such a manner as to maintain the level of liquid refrigerant in said refrigerant zone substantially constant.

In another embodiment of the invention there is provided a plurality of heat exchangers each having its own refrigerant zone, means for withdrawing refrigerant vapor from each of the refrigerant zones and for compressing the thus withdrawn refrigerant vapor, means for condensing a first portion of the thus compressed vapor, means for returning a second portion of said compressed vapor into each of said refrigerant zones, means associated with each of said refrigerant zones for controlling the rate of withdrawal of vapor from the respective refrigerant zone and the rate of introduction of compressed vapor into the respective refrigerant zone in an opposite manner responsive to the pressure in said respective refrigerant zone, and means for introducing the condensed vapor into each of said refrigerant zones in such a manner as to maintain the level of liquid refrigerant in each respective refrigerant zone substantially constant.

Accordingly it is an object of this invention to provide improved method and apparatus for controlling the cooling power of a refrigerant. Another object of the invention is to provide an improved method and apparatus for the separation of components of a multi-component mixture. Another object of the invention is to provide method and apparatus for controlling the temperature of a refrigerant. A still further object of the invention is to provide method and apparatus for controlling independently the cooling power of a refrigerant to a plurality of heat exchangers. Yet another object of the invention is to increase the rate of response of a system for controlling the cooling power of a refrigerant.

Other aspects, objects and advantages of the invention will be apparent from a study of the disclosure, the drawing and the appended claims to the invention.

Referring now to the drawing wherein there is set forth a diagrammatic representation of a crystal purification system embodying the present invention, a liquid mixture to be concentrated is passed through conduit 11 and pump 12 to the inlet of scraped surface chiller 13. Chiller 13 is provided with a jacket 14 through which a suitable refrigerant is circulated by way of inlet conduit 15 and outlet conduit 16. The scraper 17 within chiller 13 is rotated by a motor 18. The cooled liquid mixture is withdrawn from chiller 13 and passed by way of conduit 19 into the inlet of chiller 21 wherein at least a portion of one of the components of the liquid mixture is frozen to form a slurry of crystals and mother liquor. Chiller 21 is provided with a jacket 22 through which a refrigerant is circulated by way of inlet conduit 23 and outlet conduit 24. Scraper 25 in chiller 21 is rotated by a motor 26. The slurry of crystals and mother liquor is withdrawn from chiller 21 and passed by way of conduit 27 into the inlet of crystal growing tank 28. Tank 28 is provided with an agitator 29 which is driven by a motor 31. The residence time in tank 28 is generally on the order of 1 to 10 hours. From the standpoint of crystal growth, even longer times are desirable; however it is generally not economical to provide sufficiently large tanks to permit longer growth time. The outlet of tank 28 is in direct communication to the vertically positioned elbow shaped conduit 32 which in turn is in direct communication with the inlet of purification column 33.

Column 33 comprises a filtration section 34, a reflux section 35 and a melting section 36. Filtration section 34 comprises a suitable filter screen medium 37 and an external shell 38, the latter being provided with an outlet pipe 39 through which the filtrate, that is, the mother liquor, is passed. Filter medium 37 can be of any desired type known in the art, for example filter medium 37 can comprise a metallic screen, a sintered perforate metal member or a perforate member supporting a filter cloth. It is desirable that filter medium 37 be positioned integrally with respect to the adjacent walls of column 33 to maintain minimum resistance to the flow of crystals to melting section 36. Although filtration section 34 has been illustrated in the drawing as being an external filter, it is within the scope of the invention to utilize an internal filter, in which event external shell 38 could be positioned integrally with respect to the walls of column 33 and filter medium 37 would be disposed within shell 38 and preferably positioned coaxially with respect to column 33. The filtrate produced in filtration section 34 is removed from purification column 33 by way of conduit 39. Conduit 39 can contain a suitable means for maintaining a predetermined back pressure, such as valve 41 which is actuated by pressure recorder controller 42 responsive to the pressure in conduit 39. A check valve 43 can be provided in conduit 39 to prevent the back flow of withdrawn filtrate.

The crystal mass is passed into reflux section 35 wherein it is countercurrently contacted with liquid reflux as subsequently described. As the crystal mass approaches heating element 44 in melting section 36, the crystals are melted. If desired an external heating element can be utilized instead of or in addition to internal heating element 44. The heating element can be any suitable device known in the art, for example, an indirect fluid heat exchanger or an electrical heating element. The rate of introduction of heat into melting section 36 can be controlled by varying the heat exchange rate for heating element 44 responsive to the temperature of the melt, for example, where internal heating element 46 is an indirect fluid heat exchanger, its heat exchange rate can be varied by means of valve 45 which is actuated by temperature recorder controller 46 responsive to the temperature of the melt. A portion of the melt produced in heating section 36 is withdrawn through melt withdrawal conduit 47 as a purified product of the process while the remainder of the melt is forced back through reflux section 45 as reflux for effecting crystal purification.

Column 33 is provided with a pulsation producing means 48 which can comprise a cylinder 49 having one end in fluid communication with column 33, and reciprocal piston 51 mounted in cylinder 49. Reciprocation of piston 51 can be produced by any suitable means, for example by an electrical motor 52 having suitable cams associated therewith. While the crystal mass is being advanced from tank 28 through filtration section 34 and reflux section 35 into melting section 36, piston 51 is reciprocated at a suitable rate, such as in the range of about 50 to about 400 pulsations per minute, so that a pulsating pressure is exerted upon the melt reflux which is intermittently forced back, countercurrently with respect to the movement of the crystal mass into reflux section 35. A check valve 53 can be provided in melt withdrawal conduit 47 to prevent the back flow of withdrawn melt. If desired check valve 53 can be replaced or augmented by a suitable valve such as a solenoid valve which is cyclically opened and closed in synchronism with the movement of piston 51. The rate of withdrawal of melt through conduit 47 can be maintained at a substantially constant rate by means of valve 54 which is actuated by flow rate recorder controller 55 responsive to the pressure drop across an orifice 56 located in conduit 47.

Liquid refrigerant for chiller 13 is withdrawn from a refrigerant knock-out pot 61 and is passed by way of conduit 15 and pump 62 into jacket 14. The resulting warmed refrigerant is withdrawn from jacket 14 and returned by way of conduit 16 and valve 63 into refrigerant knock-out pot 61. Valve 63 is controlled by pressure recorder controller 64 responsive to the pressure in conduit 16 upstream of valve 63 to maintain such pressure substantially constant. Similarly liquid refrigerant for chiller 21 is withdrawn from refrigerant knock-out pot 65 and is passed by way of conduit 23 and pump 66 into jacket 24 with the resulting warmed refrigerant being returned to knock-out pot 62 by way of conduit 24 and valve 67. Valve 67 is controlled by pressure recorder controller 68 responsive to the pressure in conduit 24 upstream of valve 67 to maintain such pressure substantially constant. Refrigerant vapor is withdrawn from knock-out pots 61 and 65 by way of conduits 69 and 71, respectively, and passed to the inlet of compressor 72. The rate of flow of refrigerant vapor through conduit 69 is controlled by valve 73 while the rate of flow of refrigerant vapor through conduit 71 is controlled by valve 74. A portion of the compressed refrigerant vapor is passed by way of conduit 75 into and through condenser 76. The resulting condensed refrigerant vapor is passed by way of conduit 77 into surge tank 78. The liquid refrigerant is withdrawn from surge tank 78 by way of conduit 79 and is introduced into knock-out pots 61 and 65 by way of conduits 81 and 82, respectively. The rate of flow of liquid refrigerant through conduit 81 is controlled by valve 83 which is actuated by liquid level controller 84 responsive to the level of liquid refrigerant in knock-out pot 61 to maintain such level substantially constant. Similarly the rate of flow of liquid refrigerant through conduit 82 is controlled by valve 85 which is actuated by liquid level controller 86 responsive to the level of liquid refrigerant in knock-out pot 65 to maintain such level substantially constant. A portion of the compressed vapor from compressor 72 is bypassed around condenser 76 and is introduced into knock-out pots 61 and 65 by way of conduits 87 and 88, respectively. The rate of flow of the compressed vapor through conduit 87 is controlled by valve 89 while the rate of flow of compressed vapor through conduit 88 is controlled by valve 91. Valves 73 and 89 are actuated in an opposite manner by pressure recorder controller 92 responsive to the pressure in knock-out pot 61. Valves 74 and 91 are controlled in an opposite manner by pressure recorder controller 93 responsive to the pressure in knock-out pot 65. The utilization of valves 89 and 91 in bypass conduits 87 and 88, respectively, avoids cyclically loading and unloading compressor 72 with the elimination of resulting pressure surges. The utilization of valves 73 and 74 in conduits 69 and 71, respectively, permits maintaining knock-out pots 61 and 65 at different pressures, thus providing for different temperatures of the liquid refrigerant entering chiller 13 and 21. The utilization of both valves 73 and 89 with the valves being controlled in an opposite manner responsive to the pressure in knock-out 61 provides for a faster response when a change in pressure is desired or required and provides an improved dynamic performance of the percentage solids content of the slurry, in other words the integrated time average error or variation of the actual solids content from the predetermined desired percentage solids content is substantially reduced. Similarly the utilization of both valves 74 and 91 and the actuation of the valves in an opposite manner responsive to the pressure in knock-out pot 65 provides for improved response of the control system as well as improved dynamic performance of the actual percentage solids content in the slurry. When it is desired that an increase be made in the pressure in one of the knock-out pots due to either a drop in the pressure in the knock-out pot below a predetermined desired value or to a change in the set point of the respective pressure recorder controller, the valve in the respective refrigerant vapor withdrawal conduit is moved towards the closed position while the valve in the respective compressed refrigerant vapor introduction conduit is further opened. Conversely when it is desired to decrease the pressure in the respective knock-out pot, the valve in the respective refrigerant vapor withdrawal conduit is opened further while the valve in the respective compressed vapor introduction conduit is closed further. Thus the two valves act in opposition to one another to give a fast and accurate control of the pressure in the respective knock-out pot, and thus of the temperature of the liquid refrigerant in the knock-out pot, and hence percent solids in chiller effluent.

The following specific example is presented in further illustration of the invention but is not to be construed to unduly limit the invention.

A feed stream of beer to be concentrated is applied through conduit 11 and pump 12 at a rate of 10,000 lb./hr. and a temperature of 50° F. into chiller 13 wherein it is passed in indirect heat exchange with liquid ammonia which is passed through conduit 15 at a rate of approximately 22,500 lb./hr. and a temperature of approximately 24° F. and leaves jacket 14 by way of conduit 16 at a temperature of approximately 32° F. The cooled beer is withdrawn from chiller 13 at a temperature of 30° F. and passed by way of conduit 19 into chiller 21 wherein the cooled beer is passed in indirect heat exchanger with liquid ammonia which is passed through conduit 23 at a rate of approximately 67,500 lb./hr. and a temperature of approximately 16° F. and leaves jacket 22 by way of conduit 24 at a temperature of approximately 24° F. Knock-out pots 61 and 65 are maintained at a pressure of approximately 59.29 p.s.i.a. and approximately 44.12 p.s.i.a., respectively. Valves 73 and 89 are actuated by pressure recorder controller 92 with valve 73 ranging from fully closed at a 3 p.s.i. output of pressure recorder controller 92 to fully opened at a 15 p.s.i. output of controller 92 while valve 89 ranges from fully opened at a 3 p.s.i. output of controller 92 to fully closed at a 15 p.s.i. output of controller 92. Similarly valves 74 and 91 are actuated by pressure recorder controller 93 with valve 74 ranging from fully closed at a 3 p.s.i. output of controller 93 to fully opened at a 15 p.s.i. output of controller 93 while valve 91 ranges from fully opened at a 3 p.s.i. output of controller 93 to fully closed at a 15 p.s.i. output of controller 93. The slurry which is withdrawn from chiller 21 comprises approximately 40 weight percent ice crystals and is passed into tank 28 wherein the ice crystals are permitted to grow for approximately 3 hours and is finally introduced into purification column 33. The material balance of this system is set forth in the following table:

| Component | Conduit 11, #/hr. | Conduit 19, #/hr. | Conduit 27, #/hr. | Conduit 39, #/hr. | Conduit 47, #/hr. |
|---|---|---|---|---|---|
| Alcohol | 350 | 350 | 350 | 346 | 4 |
| Sugar | 600 | 600 | 600 | 594 | 6 |
| Liquid Water | 9,050 | 9,050 | 5,050 | 5,050 | 4,000 |
| Ice | | | 4,000 | | |
| Total | 10,000 | 10,000 | 10,000 | 5,990 | 4,010 |

Although this invention has been described in conjunction with the concentration of beer as the specific example it should be evident that it is not limited thereto. The invention can be employed to advantage to concentrate a variety of food products and beverages, examples of which include milk, fruit juices, vegetable juices, vinegar, coffee, tea, wine, liquors and the like. In addition the invention can be employed to separate various mixtures of organic materials. Numerous examples of mixtures of organic materials which can be separated by a fractional crystallization system embodying the present invention are described in the Thomas Patent No. 2,856,494. This invention is particularly useful when the components of the feed which is to be frozen comprises approximately 70 weight percent or more of the feed mixture. In separations of this type, it is important to increase the concentration of the feed of the component which is not frozen in order to permit more efficient operation. A multi stage apparatus can also be utilized to provide this concentration. While the invention has been described in terms of the utilization of two chillers it should be evidenced that more or fewer chillers can be employed. Furthermore while the invention has been described in terms of utilizing a knock-out pot for each chiller and independently controlling the temperature of the liquid refrigerant to each chiller, it is within the contemplation of the invention to use a single knock-out pot for a plurality of chillers with the temperature of the refrigerant to each chiller being the same.

Reasonable variation and modification are possible within the scope of the foregoing disclosure, the drawing and the appended claims to the invention.

I claim:

1. A method for controlling the cooling power of a refrigerant which is utilized to cool a fluid which is passed in indirect heat exchange with at least a portion of the liquid refrigerant in a refrigerant zone, comprising withdrawing refrigerant vapor from said refrigerant zone, compressing the thus withdrawn refrigerant vapor, condensing a first portion of the thus compressed refrigerant vapor, introducing the resulting condensed refrigerant vapor into said refrigerant zone responsive to the level of liquid refrigerant in said refrigerant zone to maintain said level substantially constant, introducing a second portion of said compressed refrigerant vapor into said refrigerant zone, and controlling the rate of withdrawal of refrigerant vapor from said refrigerant zone and the rate of introduction of said second portion of compressed refrigerant vapor into said refrigerant zone in an opposite manner responsive to the pressure in said refrigerant zone.

2. In a method which comprises introducing into a cooling zone a liquid multicomponent mixture containing one component which crystallizes first upon cooling of said mixture, passing refrigerant through said cooling zone in indirect heat exchanging relationship with said mixture thereby forming a slurry of crystals of said component in mother liquor, passing said slurry through a filtering zone from which a stream of mother liquor is withdrawn, passing the crystals and any remaining mother liquor from said filtering zone through a reflux zone and into a melting zone, introducing heat into said melting zone to melt the crystals to obtain a melt, withdrawing a portion of the melt from the melting zone as a product stream, passing the remainder of the melt counter-currently to the movement of crystals through said reflux zone as reflux therefor; the improvement comprising passing the refrigerant from said cooling zone into a refrigerant zone, withdrawing refrigerant vapor from said refrigerant zone, compressing the thus withdrawn refrigerant vapor, condensing a first portion of the thus compressed refrigerant vapor, introducing the resulting condensed refrigerant vapor into said refrigerant zone responsive to the level of liquid refrigerant in said refrigerant zone to maintain said level substantially constant, introducing a second portion of said compressed refrigerant vapor into said refrigerant zone, controlling the rate of withdrawal of refrigerant vapor from said refrigerant zone and the rate of introduction of said second portion of compressed refrigerant vapor into said refrigerant zone in an opposite manner responsive to the pressure in said refrigerant zone, and passing liquid refrigerant from said refrigerant zone into and through said cooling zone.

3. A method for cooling a fluid comprising passing said fluid through a first refrigerant zone in indirect heat exchanging relationship with at least a portion of the liquid refrigerant in said first refrigerant zone, passing the thus cooled fluid through a second refrigerant zone in indirect heat exchanging relationship with at least a portion of the liquid refrigerant in said second refrigerant zone, withdrawing refrigerant vapor from said first and second refrigerant zones, compressing the thus withdrawn refrigerant vapor, condensing a first portion of the thus compressed refrigerant vapor, introducing the resulting condensed refrigerant vapor into said first and second refrigerant zones responsive to the level of liquid refrigerant in the respective one of said first and second refrigerant zones to maintain such levels substantially constant, introducing a second portion of said compressed refrigerant vapor into said first and second refrigerant zones, controlling the rate of withdrawal of refrigerant vapor from said first refrigerant zone and the rate of introduction of said second portion of compressed refrigerant vapor into said first refrigerant zone in an opposite manner responsive to the pressure in said first refrigerant zone, controlling the rate of withdrawal of refrigerant vapor from said second refrigerant zone and the rate of introduction of said second portion of compressed refrigerant vapor into said second refrigerant zone in an opposite manner responsive to the pressure in said second refrigerant zone, and withdrawing the thus further cooled fluid from said second refrigerant zone.

4. A method in accordance with claim 3 wherein the pressure in said first refrigerant zone is different from the pressure in said second refrigerant zone.

5. In a method which comprises passing a liquid multi-component mixture containing one component which crystallizes first upon cooling of said mixture through a first cooling zone and a second cooling zone in indirect heat exchanging relationship with at least a portion of the liquid refrigerant in each of said first and second cooling zones thereby forming a slurry of crystals of said component in mother liquor, passing said slurry through a filtering zone from which a stream of mother liquor is withdrawn, passing the crystals and any remaining mother liquor from said filtering zone through a reflux zone and into a melting zone, introducing heat into said melting zone to melt the crystals to obtain a melt, withdrawing a portion of the melt from the melting zone as a product stream, passing the remainder of the melt countercurrently to the movement of crystals through said reflux zone as reflux therefor; the improvement comprising withdrawing refrigerant vapor from said first and second cooling zones, compressing the thus withdrawn refrigerant vapor, condensing a first portion of the thus compressed refrigerant vapor, introducing the resulting condensed refrigerant vapor into each of said first and second cooling zones responsive to the level of liquid refrigerant in the respective one of said first and second cooling zones to maintain said level substantially constant, introducing a second portion of said compressed refrigerant vapor into said first and second cooling zones, controlling the rate of withdrawal of refrigerant vapor from said first cooling zone and the rate of introduction of said second portion of compressed refrigerant vapor into said first cooling zone in an opposite manner responsive to the pressure in said first cooling zone, and controlling the rate of withdrawal of refrigerant vapor from said second cooling zone and the rate of introduction of said second portion of compressed refrigerant vapor into said second cooling zone in an opposite manner responsive to the pressure in said second cooling zone.

6. In an apparatus comprising a heat exchanger, means for introducing into said heat exchanger a liquid multi-component mixture containing one component which crystallizes first upon cooling of said mixture; means for passing a refrigerant through said heat exchanger in indirect heat exchanging relationship with said mixture thereby forming a slurry of crystals of said component in mother liquor; a purification column comprising a filtering section, a reflux section and a melting section; means for passing said slurry into said filtering section; means for withdrawing a stream of mother liquor from said filtering section; means for passing the crystals and any remaining mother liquor from said filtering section through said reflux section into said melting section; means for introducing heat into said melting section to melt the crystals to obtain a melt; means for withdrawing a portion of the melt from said melting section as a product stream; means for passing the remainder of the melt countercurrently to the movement of crystals through said reflux section as reflux therefor; the improvement comprising a refrigerant knock-out pot; said means for passing a refrigerant comprising means for withdrawing liquid refrigerant from said knock-out pot and passing the thus withdrawn liquid refrigerant into said heat exchanger and for returning the warmed refrigerant to said knock-out pot; means for withdrawing refrigerant vapor from said knock-out pot; means for compressing the thus withdrawn refrigerant vapor; means for condensing a first portion of the thus compressed refrigerant vapor; means for introducing the resulting condensed refrigerant vapor into said knock-out pot responsive to the level of liquid refrigerant in said knock-out pot to maintain said level substantially constant; means for introducing a second portion of said compressed refrigerant vapor into said knock-out pot; and means for controlling the rate of withdrawal of refrigerant vapor from said knock-out pot and the rate of introduction of said second portion of compressed refrigerant vapor into said knock-out pot in an opposite manner responsive to the pressure in said knock-out pot.

7. Apparatus in accordance with claim 6 wherein said means for withdrawing refrigerant vapor from said knock-out pot comprises a first conduit having a first valve operatively connected therein; wherein said means for introducing a second portion of said compressed refrigerant vapor comprises a second conduit having a second valve operatively connected therein; and said means for controlling comprises a pressure controller, means for establishing a signal representative of the pressure in said knock-out pot, means for applying said signal to an input of said pressure controller, and means responsive to the output of said pressure controller for actuating said first and second valves in an opposite manner.

8. Apparatus for controlling the temperature of a fluid comprising a heat exchanger, means for passing said fluid through said heat exchanger, a refrigerant knock-out pot, means for withdrawing liquid refrigerant from said knock-out pot and passing the thus withdrawn liquid refrigerant through said heat exchanger in indirect heat exchanging relationship with said fluid and for returning the warmed refrigerant to said knock-out pot, means for withdrawing refrigerant vapor from said knock-out pot, means for compressing the thus withdrawn refrigerant vapor, means for condensing a first portion of the thus compressed refrigerant vapor, means for introducing the resulting condensed refrigerant vapor into said knock-out pot responsive to the level of liquid refrigerant in said knock-out pot to maintain said level substantially constant, means for introducing a second portion of said compressed refrigerant vapor into said knock-out pot, and means for controlling the rate of withdrawal of refrigerant vapor from said knock-out pot and the rate of introduction of said second portion of compressed refrigerant vapor into said knock-out pot in an opposite manner responsive to the pressure in said knock-out pot.

9. Apparatus comprising a first heat exchanger, a second heat exchanger, means for passing a liquid multicomponent mixture containing one component which crystallizes first upon cooling of said mixture through said first and second heat exchangers, a first knock-out pot, a second knock-out pot, means for withdrawing liquid refrigerant from said first knock-out pot and passing the thus withdrawn liquid refrigerant through said first heat exchanger in indirect heat exchanging relationship with said mixture and for returning the resulting warmed refrigerant to said first knock-out pot, means for withdrawing liquid refrigerant from said second knock-out pot and for passing the thus withdrawn liquid refrigerant through said second heat exchanger in indirect heat exchanging relationship with said mixture and for returning the resulting warmed refrigerant to said second knock-out pot, means for withdrawing refrigerant vapor from said first and second knock-out pots, means for compressing the thus withdrawn refrigerant vapor, means for condensing a first portion of the thus compressed refrigerant vapor, means for introducing the resulting condensed refrigerant vapor into said first and second knock-out pots responsive to the level of liquid refrigerant in the respective one of said first and second knock-out pots, means for introducing a second portion of said compressed refrigerant vapor into said first and second knock-out pots, means for controlling the rate of withdrawal of refrigerant vapor from said first knock-out pot and the rate of introduction of said second portion of compressed refrigerant vapor into said first knock-out pot in an opposite manner responsive to the pressure in said first knock-out pot, and means for controlling the rate of withdrawal of refrigerant vapor from said second knock-out pot and the rate of introduction of said second portion of compressed refrigerant vapor into said second knock-out pot in an opposite manner responsive to the pressure in said second knock-out pot.

References Cited in the file of this patent
UNITED STATES PATENTS

| | | |
|---|---|---|
| 1,741,652 | Olsen | Dec. 31, 1929 |
| 1,805,700 | King | May 19, 1931 |
| 2,363,273 | Waterfill | Nov. 21, 1944 |
| 2,506,757 | Wilson | May 9, 1950 |
| 2,691,870 | Smith | Oct. 19, 1954 |
| 2,815,364 | Green | Dec. 3, 1957 |